United States Patent
Akie

(10) Patent No.: US 8,377,560 B2
(45) Date of Patent: Feb. 19, 2013

(54) GLAZE COMPOSITION

(75) Inventor: Takashige Akie, Nagoya (JP)

(73) Assignee: Nichiha Corporation, Nagoya-Shi (JP)

( * ) Notice: Subject to any disclaimer, the term of this patent is extended or adjusted under 35 U.S.C. 154(b) by 1380 days.

(21) Appl. No.: 12/068,862

(22) Filed: Feb. 12, 2008

(65) Prior Publication Data

US 2008/0199708 A1     Aug. 21, 2008

(30) Foreign Application Priority Data

Feb. 16, 2007   (JP) ................. 2007-037107

(51) Int. Cl.
| | |
|---|---|
| *C03C 8/00* | (2006.01) |
| *C04B 41/86* | (2006.01) |
| *B32B 9/00* | (2006.01) |
| *C09D 1/00* | (2006.01) |
| *B05D 1/36* | (2006.01) |

(52) U.S. Cl. ........ 428/428; 428/432; 428/689; 428/697; 428/699; 428/448; 428/454; 428/375; 428/404; 106/626; 106/628; 106/631; 106/632; 106/635; 106/286.2; 106/286.4; 106/286.5; 106/286.6; 106/286.7; 106/286.8; 106/287.17; 106/287.34; 501/14; 501/143; 501/144

(58) Field of Classification Search .......... None
See application file for complete search history.

(56) References Cited

U.S. PATENT DOCUMENTS

| | | | | |
|---|---|---|---|---|
| 3,210,204 | A | * | 10/1965 | Costain et al. ............. 501/18 |
| 4,200,468 | A | * | 4/1980 | Hurley, Jr. ............... 501/14 |
| 2002/0022133 | A1 | * | 2/2002 | Hayashi et al. .......... 428/432 |
| 2005/0035500 | A1 | * | 2/2005 | Matsumoto et al. ...... 264/602 |

FOREIGN PATENT DOCUMENTS

| | | | |
|---|---|---|---|
| JP | 2002-68861 A | | 3/2002 |
| JP | 2005-194143 A | | 7/2005 |
| JP | 2005-194144 A | | 7/2005 |
| JP | 2005-320174 A | | 11/2005 |
| JP | 2006320214 A | * | 11/2006 |
| KR | 2003075855 | * | 9/2003 |

OTHER PUBLICATIONS

JP 2005-194143 (Jul. 21, 2005)—Machine Translation.*
JP 2005-194144 (Jul. 21, 2005)—Machine Translation.*

* cited by examiner

*Primary Examiner* — David Sample
(74) *Attorney, Agent, or Firm* — Birch, Stewart, Kolasch & Birch, LLP

(57) ABSTRACT

A glaze composition which makes it possible that a base material for an inorganic calcined substance containing a lot of vitreous material is glazed without having corrosion. The glaze composition comprises a plastic material, a non-plastic material, and a solvent material, wherein the plastic material comprises at least one material selected from the group consisting of Gairome clay, Kibushi clay, kaolin and talc; the non-plastic material comprises at least one material selected from the group consisting of silica, calcined kaolin, pottery stone, pyrophyllite, pottery shards, chamotte and zircon; and the solvent material comprises at least one material selected from the group consisting of feldspar, lime stone, dolomite, zinc oxide and lithium carbonate.

14 Claims, No Drawings

GLAZE COMPOSITION

This non-provisional application claims priority under 35 U.S.C. 119(a)-(d) on Application No. 2007-037107 filed in Japan on Feb. 16, 2007.

FIELD OF THE INVENTION

The present invention relates to a glaze composition used for glazing a surface of a base material of an inorganic calcined substance containing a vitreous material.

BACKGROUND OF THE INVENTION

An inorganic board has been produced by steps of: molding a hydraulic inorganic material such as siliceous raw material, calcareous raw material or cement into a plate shape, curing/hardening the plate to make a base material, and calcining the base material to form an inorganic board. This inorganic board is excellent in durability, beauty and texture, which allows the board to be used as a building material for a posh external wall. For example, JP 2005-194143A, discloses a method of producing an inorganic board comprising the steps of: molding a board using slag and calcium hydroxide as a hydraulic inorganic material, curing/hardening the board, and then calcining the board. Also, JP 2005-0194144A discloses a method of producing a three layered calcined substance made of a raw material containing slag and calcium hydroxide. The base material is glazed before calcining. However, when generally well-used flit glaze is applied onto a base material containing a lot of vitreous material such as slag and vitreous material, the base material may be corroded by a $B_2O_3$ component of the flit or a glass phase with low melting viscosity formed in a relatively low temperature range.

BRIEF SUMMARY OF THE INVENTION

An object of the present invention is to provide a glaze composition which can be used to glaze a base material containing a lot of vitreous material and calcining without having corrosion.

In order to accomplish the above object, the glaze composition of the present invention comprises: a plastic material, a non-plastic material, and a solvent material, wherein the plastic material comprises at least one material selected from the group consisting of Gairome clay, Kibushi clay, kaolin and talc; the non-plastic material comprises at least one material selected from the group consisting of silica, calcined kaolin, pottery stone, pyrophyllite, pottery shards, chamotte and zircon; and the solvent material comprises at least one material selected from the group consisting of feldspar, lime stone, dolomite, zinc oxide and lithium carbonate.

In an embodiment, the glaze composition further comprises an inorganic pigment.

In an embodiment, the plastic material accounts for 25-55 weight %, the non-plastic material accounts for 5-20 weight %, and the solvent material accounts for 40-60 weight %, based on a total solid content.

In an embodiment, the non-plastic material comprises at least zircon in a concentration of 5-20 weight % based on a total solid content other than zircon.

The glaze composition of the present invention makes it possible that a base material for an inorganic calcined substance containing a lot of vitreous material is glazed without the formation of corrosion.

DETAILED DESCRIPTION OF THE INVENTION

Preferred embodiments to carry out the present invention are described below.

The glaze composition of the present invention comprises three major components, i.e., a plastic material, a non-plastic material and a solvent material.

[Plastic Material]

The plastic material is a material which provides a plasticity necessary for molding, i.e., forming shape. Clay such as Gairome clay, Kibushi clay, Kaolin, halloysite, ericite, bentonite, dolomite and mixtures thereof can be used as the plastic material. Although Gairome clay was used as a plastic material in the example (as described below), Kibushi clay, kaolin, talc, or combination of these material mentioned can also be used.

[Non-Plastic Material]

The non-plastic material is a material for preventing cracks and distortions caused by shrinkage occurring at calcining, and for providing mechanical strength by forming a glass phase through a reaction with alkali. At least one of silica, diatomaceous earth, "Kira" (which is a waste derived from purification process by elutriation of Gairome clay; the waste containing a small amount of feldspar, mica, iron oxide and clay component), silica fume, chamotte and the like can be named as the non-plastic material. Although silica, pottery stone, calcined kaolin and zircon were used as a non-plastic material in the examples (as described below), pyrophyllite, pottery shards, chamotte or a combination of these mentioned can also be used.

[Solvent Material]

The solvent material is a base material capable of forming a glass phase at lower temperatures (such as 800-1000° C.) in the calcination process. In the glass phase the plastic material and the non-plastic material can be dissolved. A feldspar, dolomite, limestone, magnesite, talc and mixtures thereof can be used as the solvent material. Although feldspar, limestone, zinc oxide and lithium carbonate were used as a solvent material in the example, dolomite or a combination of these mentioned can also be used.

[Other Components]

An inorganic pigment can be added to the glaze composition of the present invention as a coloring material. An inorganic pigment, for example, is selected based on the expected expressed color tone and include at least one of cobalt compound (blue), manganese compound (brown or purple), nickel compound (green, blue or red), uranium compound (yellow, red or black), chromium compound (red or green), iron compound (yellow, reddish brown or red), copper compound (green), titanium compound (yellow), gold compound (yellowish green), cerium-molybdenum compound (light blue), cerium-titanium compound (yellow), praseodymium phosphate (green), and neodymium phosphate (rosy red).

[Composition]

As to a blend ratio of the plastic material, a non-plastic material and a solvent material, the plastic material accounts for 25-55 weight %, the non-plastic material accounts for 5-20 weight %, and the solvent material accounts for 40-60 weight % based on the total weight of the composition. If the plastic material content is less than 25 weight %, the fire resistance of the glaze (layer) is lowered, which makes it difficult to prevent corrosion of the base material caused by an over-coating glaze layer ("glaze"). If the plastic material content is more than 55 weight %, the drying shrinkage becomes large, which may cause cracks, and the fire resistance of the glaze (layer) becomes too high, which provides poor adhesion. In addition, the thermal expansion of the glaze becomes too small, which causes glaze-peeling. The fire resistance is defined herein based on the degree of calcination used for each glaze. The glaze is roughly classified into a high fire resistance glaze where the glaze is calcined at around 1300°

C. or a low fire resistance glaze where the glaze is calcined at around 1000° C. The glaze-peeling is a phenomenon wherein a glaze is peeled off the base material when the thermal expansion coefficient of the glaze is significantly smaller than that of the base material on which the glaze is layered. If a non-plastic material content is less than 5 weight %, the effect of reducing drying shrinkage disappears, and if the content is more than 20 weight %, the thermal expansion coefficient becomes larger, which may cause warp. If the solvent material content is less than 40 weight %, the glaze composition has poor reactivity, which makes adhesion to the base material weak. If more than 60 weight %, the fire resistance becomes low, which makes it difficult to prevent corrosion of the base material caused by an over-coating glaze layer ("glaze"). In addition, a warp may result when the thermal expansion coefficient becomes larger.

The above-mentioned glaze composition is to be used as an under-coating glaze layer ("engobe") on a base material for an inorganic calcined substance. A base material for an inorganic calcined substance on which a glaze composition of the present invention is glazed comprises a hydraulic inorganic material, a vitreous material, an aggregate, a reinforcing fiber, a burnable organic component and a recycled waste material as a main component (i.e., makes up more than 50 wt % of the base material). In the case where, as a hydraulic inorganic material, a slag and the like containing a lot of vitreous material is used for a raw material of a base material, if an over-coating glaze including $B_2O_3$ or the like is glazed directly on the base material, a surface of the base material may be corroded to form a bumpy surface. On the contrary, when a glaze of the present invention not including $B_2O_3$ or flit is first glazed as an under-coating glaze ("engobe"), then an over-coating glaze is glazed on the under-coating glaze, the surface of the base material will hardly be corroded to form a bumpy surface, and the adhesion between the over-coating glaze and the surface of the base material can be improved.

[A Base Material for an Inorganic Calcined Substance]

The base material for an inorganic calcined substance on which a glaze composition of the present invention is glazed comprises: a hydraulic inorganic material such as cement, blast furnace slag, and calcium hydroxide, a vitreous material such as Shirasu, fly-ash, glass powder and mixtures thereof, an aggregate such as silica powder, chamotte, pottery stone powder, perlite, clays and mixtures thereof, reinforcing fiber made of inorganic fiber and/or organic fiber, a burnable organic component such as expanded polystyrene beads, expanded polypropylene beads, polyvinyl alcohol resin and mixtures thereof, and a recycled waste material such as crushed calcined substance such as pottery tile shards. As to raw materials for the base material for an inorganic calcined substance on which a glaze composition of the present invention is glazed, a blast furnace slag and a calcium hydroxide are most preferable as a hydraulic inorganic material; a powdered glass with low melting point such as having a softening temperature of 900° C. or less is most preferable as a vitreous material; a silica powder, pottery stone powder and pottery tile shards are most preferable as an aggregate; a Wollastonite and a vinylon fiber are most preferable as a reinforcing fiber; expanded polypropylene beads and a polyvinyl alcohol resin are most preferable as a burnable organic component; and pottery tile shards are most preferable as a recycled waste material. In addition, other appropriate materials can be used. For example, an inorganic pigment, can be added as needed. A base material for an inorganic calcined substance is prepared using the above-mentioned materials as follows. First, a blended raw material is prepared by blending the following: 15-35 weight % of hydraulic inorganic material, 1-15 weight % of vitreous material, 5-45 weight % of aggregate, 15-35 weight % of reinforcing fiber, 0.2-10 weight % of burnable organic component, 5-50 weight % of a recycled waste material, and 5-20 weight % of water. Then the blended raw material is press-molded by a press-molding machine to form a base material for an inorganic calcined substance. The press molding machine has a lower plate with a frame to form a cavity and an upper plate to press the blended raw material placed in the cavity. The upper plate has a molding plate, preferably made of metal, which may have an embossed pattern. A glaze is applied onto the press-molded base material for an inorganic calcined substance.

[Method of Glazing]

A method of glazing (applying a glaze) using a glaze composition of the present invention is described below. First, a glaze composition of the present invention is glazed on the base material for an inorganic calcined substance to form an under-coating of glaze (as engobe). The base material for an inorganic calcined substance is preferably dried in advance. As application methods, commonly known methods such as spray coating, flow coating, dip coating, brush coating and the like can be used. The coating amount of the glaze normally ranges from 100 to 250 g/m$^2$. Then, an over-coating glaze is applied on the above-described under-coating glaze (engobe). Although there is no specified limitation with respect to the over-coating glaze, a low fire resistance glaze such as flit glaze is preferable as the calcinations is made at as low as 1200° C. or less. Application methods of the over-coating glaze are the same as the under-coating glaze (engobe), and the amount of the over-coating glaze normally ranges from 200 to 600 g/m$^2$. An inorganic calcined substance is produced after 3 hours calcinations at, for example, 1150° C.

Example 1

Examples of the present invention and comparison examples are described below. A blended raw material was prepared by blending the following: a blast furnace slag of 24 weight % and a calcium hydroxide of 2.7 weight % as a hydraulic inorganic material, an E glass of 10 weight % as a vitreous material, a silica powder of 17.5 weight % and a pottery stone powder of 10 weight % as an aggregate, a wollastonite of 25 weight % and a vinylon fiber of 0.3 weight % as a reinforcing fiber, a polyvinyl alcohol resin of 0.5 weight % as a burnable organic component, pottery tile shards of 10 weight % as a recycled waste material, and an appropriate amount of water. Then the blended raw material was press-molded at the pressure of 15 MPa by a press-molding machine to form a base material for an inorganic calcined substance. Glazes shown in Table 1 representing examples 1-5 and in Table 2 representing comparison examples 1-5 were applied onto the press-molded base material for an inorganic calcined substance as an under-coating glaze (engobe). Then a matting glaze containing a flit was applied as an over-coating glaze. The matting glaze was added to make the surface matted/deglossed. Calcination was carried out for 3 hours at 1150° C. The properties of the obtained inorganic calcined substance are shown at the lower part of Tables 1 and 2. The surface nature of the over-coating glaze was evaluated by visual inspection. The amount of "warp" of each inorganic calcined sample with 500 mm×1000 mm size was measured at 900 mm span. The influence on warpage was evaluated by comparing the warp amount of the glazed inorganic calcined substance sample and that of non-glazed inorganic calcined sample (as a reference) assuming that the warp amount of non-glazed calcined sample is 0. (+ symbol means the warp is concave compared to that of non-glazed calcined sample). The "crack resistance" was evaluated by visual inspection after being exposed to 10 cycles of corrosive conditions wherein one cycle consists of 4 hours of water absorption, 4 hours of carbonation ($CO_2$ concentration is 5%), and drying at 100° C. for 15-16 hours. No crack is represented by O, a few cracks is represented by Δ, and a number of cracks is represented by X. "Delayed-crazing Resistance" was evaluated by visual inspection after being exposed to 5 cycles of pressure cycles wherein one cycle consists of one hour of raising pressure up to 10 atmospheric pressure, staying under 10 atmospheric pressure for one hour and then being left in natural cooling to reach room temperature (using autoclave). No crack (crazing) is represented by O, a few cracks is represented by Δ, and a number of cracks is represented by X. Delayed-crazing happens when cracks (crazing) appear as time passes after the inorganic calcined substance has been made.

TABLE 1

| Blended raw material | | Example 1 | Example 2 | Example 3 | Example 4 | Example 5 |
|---|---|---|---|---|---|---|
| Plastic material | Gairome clay | 40 | 50 | 35 | 35 | 35 |
| Solvent material | feldspar | 55 | 45 | 50 | 50 | 50 |
| | lime | 3 | 3 | 3 | 3 | 3 |
| | zinc oxide | 1 | 1 | 1 | 1 | 1 |
| | lithium carbonate | 1 | 1 | 1 | 1 | 1 |
| Non-plastic material | silica | 0 | 0 | 10 | 0 | 0 |
| | pottery stone | 0 | 0 | 0 | 10 | 0 |
| | calcined kaolin | 0 | 0 | 0 | 0 | 10 |
| | Zircon | 10 | 10 | 10 | 10 | 10 |
| Surface nature of the over-coating glaze | | Good | Good | Good | Good | Good |
| Warp (compared to non-glazed) | | −0.25 | −0.43 | +0.36 | +0.28 | +0.14 |
| Crack resistance | | O | O | O | O | O |
| Delayed-crazing Resistance | | O | O | O | O | O |

As shown in Table 1, each of examples 1-5 provided a good glazed surface of a matting glaze used as over-coating glaze. Also there was little influence on warp and no problem with crack resistance and Delayed-crazing Resistance. In view of this, it was concluded that the glaze composition of the examples is a good glaze composition and is a good match with the base material.

As shown in Table 2, comparison example 1, which has high content of Gairome clay of plastic material, indicates that corrosion by an over-coating glaze can effectively be prevented but cracks were formed because of the large drying shrinkage of the glaze composition. Comparison example 2 having a high content of feldspar as the solvent material and comparison example 3 having a high content of lime, zinc oxide and lithium carbonate having a poor ability to prevent corrosion by an over-coating glaze since these two glaze compositions have a lower fire resistance. Particularly comparison example 3 was considerably corroded. Comparison example 4 having a high content of silica as the non-plastic material and comparison example 5 having a high content of pottery stone, provided a good glazed surface of an over-coating glaze. However the warp after calcination became fairly large compared to non-glazed inorganic calcined substances because of an abnormal expansion (abnormal shrinkage) by α-β inversion of quartz at around 550-600° C. based on an increase of unmelted $SiO_2$ of the glaze composition. Also in the testing of Delayed-crazing Resistance, the formation of a slight amount of crazing/cracks was observed.

What is claimed is:
1. An inorganic calcined substance, comprising:
a base material;
under-coating glaze layer disposed on the base material, the under-coating glaze layer comprising a glaze composition; and
an over-coating glaze layer disposed on the under-coating glaze layer, the over-coating glaze layer comprising $B_2O_3$ wherein
the inorganic calcined substance is formed by calcining the under-coating glaze layer and the over-coating glaze layer disposed on the base material at temperature of 1200° C. or less,
the glaze composition of the under-coating glaze layer comprising:

TABLE 2

| Blended raw material | | Comparison example 1 | Comparison example 2 | Comparison example 3 | Comparison example 4 | Comparison example 5 |
|---|---|---|---|---|---|---|
| Plastic material | Gairome clay | 60 | 20 | 35 | 30 | 30 |
| Solvent material | feldspar | 35 | 75 | 55 | 40 | 40 |
| | lime | 3 | 3 | 6 | 3 | 3 |
| | zinc oxide | 1 | 1 | 2 | 1 | 1 |
| | lithium carbonate | 1 | 1 | 2 | 1 | 1 |
| Non-plastic material | silica | 0 | 0 | 0 | 25 | 0 |
| | pottery stone | 0 | 0 | 0 | 0 | 25 |
| | calcined kaolin | 0 | 0 | 0 | 0 | 0 |
| | Zircon | 10 | 10 | 10 | 10 | 10 |
| Surface nature of the over-coating glaze | | Cracks by drying | Slight corrosion | Significant corrosion | Good | Good |
| Warp (compared to non-glazed) | | −0.64 | +0.39 | +0.52 | +0.89 | +0.63 |
| Crack resistance | | O | O | O | O | O |
| Delayed-crazing Resistance | | O | O | O | Δ | Δ | a plastic material;
a non-plastic material; and a solvent material, wherein
the plastic material comprises at least one material selected from the group consisting of Gairome clay, Kibushi clay, kaolin and talc,
the non-plastic material comprises at least one material selected from the group consisting of silica, calcined kaolin, pottery stone, pyrophyllite, pottery shards, chamotte and zircon,
the solvent material comprises at least one material selected from the group consisting of feldspar, lime stone, dolomite, zinc oxide and lithium carbonate,
the amount of the plastic material is 25-55 weight %,
the amount of the non-plastic material is 5-20 weight %, and
the amount of the solvent material is 40-60 weight %, based on a total solid content, and
the base material comprises:
a hydraulic inorganic material;
a vitreous material,
an aggregate;
a reinforcing fiber;
a burnable organic component; and
a recycled waste material as a main component.

2. The inorganic calcined substance according to claim 1, wherein the hydraulic inorganic material comprises vitreous material.

3. The inorganic calcined substance according to claim 1, wherein
the hydraulic inorganic material is at least one selected from the group consisting of cement, blast furnace slag, and calcium hydroxide,
the vitreous material is at least one selected from the group consisting of Shirasu, fly-ash and glass powder,
the aggregate is at least one selected from the group consisting of silica powder, chamotte, pottery stone powder, perlite and clays;
the reinforcing fiber is made of inorganic fiber and/or organic fiber,
the burnable organic component is at least one selected from the group consisting of expanded polystyrene beads, expanded polypropylene beads and polyvinyl alcohol resin, and
the recycled waste material is a crushed calcined substance.

4. The inorganic calcined substance according to claim 3, wherein the glass powder has a softening temperature of 900° C. or less.

5. The inorganic calcined substance according to claim 3, wherein the aggregate is at least one selected from the group consisting of silica powder, pottery stone powder and pottery tile shards.

6. The inorganic calcined substance according to claim 3, wherein the reinforcing fiber is at least one selected from the group consisting of Wollastonite and vinylon fiber.

7. The inorganic calcined substance according to claim 3, wherein the burnable organic component is at least one selected from the group consisting of expanded polypropylene beads and a polyvinyl alcohol resin.

8. The inorganic calcined substance according to claim 3, wherein the crushed calcined substance is pottery tile shards.

9. The inorganic calcined substance according to claim 3, wherein the base material is a blend comprising: 15-35 weight % of hydraulic inorganic material, 1-15 weight % of vitreous material, 5-45 % of aggregate, 15-35 weight % of reinforcing fiber, 0.2-10 weight % of burnable organic component, 5-50 weight % of a recycled waste material, and 5-20 weight % of water, wherein the weight % values are based on the weight of the base material.

10. The inorganic calcined substance according to claim 1, wherein the glaze composition of the under-coating layer does not contain $B_2O_3$.

11. A method of preparing an inorganic calcined substance, comprising the steps of:
applying an under-coating glaze composition for forming an under-coating glaze layer on a base material; and
applying an over-coating glaze composition comprising $B_2O_3$ for forming an over-coating glaze layer on said under-coating glaze layer;
calcining the under-coating glaze layer and the over-coating glaze layer disposed on the base material at temperature of 1200° C. or less, wherein
the under-coating glaze composition comprises:
a plastic material,
a non-plastic material, and
a solvent material, wherein
the plastic material comprises at least one material selected from the group consisting of Gairome clay, Kibushi clay, kaolin and talc,
the non-plastic material comprises at least one material selected from the group consisting of silica, calcined kaolin, pottery stone, prophyllite, pottery shards, chamotte and zircon, and
the solvent material comprises at least one material selected from the group consisting of feldspar, lime stone, dolomite, zinc oxide and lithium carbonate,
the amount of the plastic material is 25-55 weight %,
the amount of the non-plastic material is 5-20 weight %, and
the amount of the solvent material is 40-60 weight %, based on a total solid content of the under-coating glaze composition, and
the base material comprises:
a hydraulic inorganic material;
a vitreous material;
an aggregate;
a reinforcing fiber;
a burnable organic component; and
a recycled waste material as a main component.

12. The method according to claim 11, wherein the under-coating glaze composition further comprises an inorganic pigment.

13. The method according to claim 11, wherein the non-plastic material comprises at least zircon in a concentration of 5-20 weight % based on the total solid content other than zircon.

14. The method according to claim 11, wherein the under-coating glaze composition does not contain $B_2O_3$.

* * * * *